(12) United States Patent
Matsutori

(10) Patent No.: US 7,187,454 B2
(45) Date of Patent: Mar. 6, 2007

(54) MEASURING DEVICE

(75) Inventor: Hideki Matsutori, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 21 days.

(21) Appl. No.: 10/522,190

(22) PCT Filed: Jul. 22, 2003

(86) PCT No.: PCT/JP03/09240

§ 371 (c)(1),
(2), (4) Date: Jan. 24, 2005

(87) PCT Pub. No.: WO2004/010077

PCT Pub. Date: Jan. 29, 2004

(65) Prior Publication Data

US 2005/0225755 A1 Oct. 13, 2005

(30) Foreign Application Priority Data

Jul. 24, 2002 (JP) ............................. 2002-215347
Jul. 24, 2002 (JP) ............................. 2002-215348

(51) Int. Cl.
*G01B 11/00* (2006.01)
*G01N 21/00* (2006.01)

(52) U.S. Cl. ................. 356/626; 356/241.1; 356/241.4

(58) Field of Classification Search ................ 356/626, 356/635, 601, 241.1, 241.2, 241.3, 241.4, 356/241.6
See application file for complete search history.

(56) References Cited

U.S. PATENT DOCUMENTS

| 4,712,916 A | * | 12/1987 | Gunn ....................... 356/241.1 |
| 2002/0174707 A1 | * | 11/2002 | Sawafuji et al. ............. 73/1.81 |
| 2005/0005715 A1 | * | 1/2005 | Sawafuji et al. ........... 73/865.8 |

FOREIGN PATENT DOCUMENTS

| JP | 05-126556 | 5/1993 |
| JP | 2001-349721 | 12/2001 |

* cited by examiner

*Primary Examiner*—HWA (Andrew) Lee
*Assistant Examiner*—Roy M. Punnoose
(74) *Attorney, Agent, or Firm*—David S. Safran

(57) ABSTRACT

While a ball 14 is inserted into a hole WA of a workpiece W and is moved in the longitudinal direction of the hole WA while automatically centripetally moved, a change of back pressure of a gas injected into the hole WA is detected by a converter 30, and at the same time reflected light from a reflection member 18 provided on the ball 14 is received by a light receiving unit 22 and a change of peak position A of an amount of the received light is calculated, so as to calculate an inner diameter, straightness, and cylindricity of the hole WA, thus providing an inexpensive noncontact measuring apparatus 10 which measures the inner diameter, the straightness, and the cylindricity of the hole WA.

10 Claims, 6 Drawing Sheets

MEASURING DEVICE

TECHNICAL FIELD

The present invention relates to a measuring apparatus which measures a hole formed in a workpiece, and more particularly to a measuring apparatus which measures an inner diameter, straightness, and cylindricity of a hole without contact.

BACKGROUND ART

Generally, an inner diameter, straightness, and cylindricity of a hole of a cylindrical component often used as an automobile component or a machine tool component are measured by a method in which a roundness measuring apparatus or the like is used, an object to be measured (hereinafter referred to as a workpiece) is secured, and a contact detector is rotated along an inner surface of the hole and moved in the longitudinal direction of the hole for measurement. For a small workpiece, a roundness measuring apparatus which rotates the workpiece for measurement is used.

However, these roundness measuring apparatuses are general-purpose measuring apparatuses, which have various functions and are expensive. The roundness measuring apparatuses are of contact type, and a scratch or a trail of a contact may remain on a surface to be measured. Further, if measuring pressure is reduced to prevent a scratch on the surface to be measured, the contact is caught by a burr or a groove, if any, in an inner peripheral portion of the hole, which causes variations in measurement values.

The present invention is made in view of such circumstances, and has an object to provide an inexpensive measuring apparatus which can measure an inner diameter, straightness, and cylindricity of a hole formed in a workpiece without contact.

SUMMARY OF THE INVENTION

In order to attain the above described object, the present invention is directed to a measuring apparatus which measures a hole formed in a workpiece, comprising: a holding mount which holds a workpiece and has an injection port for injecting a gas into the hole formed in the workpiece; a ball which is inserted into the hole formed in the workpiece; an elastic member which elastically supports the ball; a converter which converts back pressure of the gas injected from the injection port into an electrical signal; and a control unit which calculates an inner diameter of the hole according to the electrical signal outputted from the converter while the ball is inserted into the hole formed in the workpiece and the gas is injected into the hole.

According to the present invention, the gas is injected into a gap created between an inner peripheral surface of the hole and the ball, and the back pressure of the injected gas is detected by the converter to calculate the inner diameter of the hole, thus providing an inexpensive noncontact measuring apparatus of an inner diameter.

The present invention is also directed to a measuring apparatus which measures a hole formed in a workpiece, comprising: a holding mount which holds a workpiece and has an injection port for injecting a gas into the hole formed in the workpiece; a ball which is inserted into the hole formed in the workpiece; an elastic member which elastically supports the ball; a reflection member which is mounted to the ball and reflects light supplied from a light source; a light receiving unit which receives the light reflected by the reflection member; a moving device which moves the elastic member and the ball along a longitudinal direction of the hole; and a control unit which calculates straightness of the hole by calculating a change of peak position of an amount of light received by the light receiving unit while the ball is inserted into the hole formed in the workpiece and the ball is moved while automatically centripetally moved with respect to the hole by injecting the gas into the hole.

According to the present invention, while the ball inserted into the hole is moved along the longitudinal direction of the hole while automatically centripetally moved, the reflected light from the reflection member provided on the ball is received by the light receiving unit, and the change of peak position of the amount of received light is calculated, so as to calculate the straightness of the hole, thus providing an inexpensive noncontact measuring apparatus of straightness.

The present invention is also directed to a measuring apparatus which measures a hole formed in a workpiece, comprising: a holding mount which holds a workpiece and has an injection port for injecting a gas into the hole formed in the workpiece; a ball which is inserted into the hole formed in the workpiece; an elastic member which elastically supports the ball; a converter which converts back pressure of the gas injected from the injection port into an electrical signal; a reflection member which is mounted to the ball and reflects light supplied from a light source; a light receiving unit which receives the light reflected by the reflection member; a moving device which moves the elastic member and the ball along a longitudinal direction of the hole; and a control unit which calculates cylindricity of the hole according to the electrical signal outputted from the converter and data of a change of peak position of an amount of light received by the light receiving unit while the ball is inserted into the hole formed in the workpiece and the ball is moved while automatically centripetally moved with respect to the hole by injecting the gas into the hole.

According to the present invention, while the ball inserted into the hole is moved along the longitudinal direction of the hole while automatically centripetally moved, the back pressure of the gas injected into the hole is detected by the converter, the reflected light from the reflection member provided on the ball is received by the light receiving unit, and the change of peak position of the amount of received light is calculated, so as to calculate the cylindricity of the hole, thus providing an inexpensive noncontact measuring apparatus of cylindricity.

Preferably, the reflection member comprises a corner cube. This causes an entering angle and an emitting angle of the light projected from the light source and reflected by the reflection member to be always equal, and allows accurate detection of the change of peak position of the amount of light received by the light receiving unit, even if the ball is inclined when the ball is moved.

Preferably, the elastic member comprises at least three linear elastic bodies which are parallel to each other. This prevents the inclination of the ball even if an axis of the hole is curve, and allows accurate detection of the change of peak position of the amount of light received by the light receiving unit.

The present invention is also directed to a measuring apparatus which measures a hole formed in a workpiece, comprising: a holding mount which holds a workpiece and has an injection port for injecting a gas into the hole formed in the workpiece; a ball which is inserted into the hole formed in the workpiece; an elastic member which elastically supports the ball; an optical fiber which is attached to the ball and carries and projects light supplied from a light source; a light receiving unit which receives the light projected from the optical fiber; a moving device which moves the elastic member, the ball, and the optical fiber along a longitudinal direction of the hole; and a control unit which calculates straightness of the hole by calculating a change of peak position of an amount of light received by the light receiving unit while the ball is inserted into the hole formed in the workpiece and the ball is moved while automatically centripetally moved with respect to the hole by injecting the gas into the hole.

According to the present invention, while the ball inserted into the hole is moved in the longitudinal direction of the hole while automatically centripetally moved, the projected light from the optical fiber provided on the ball is received by the light receiving unit, and the change of peak position of the amount of received light is calculated, so as to calculate the straightness of the hole, thus providing an inexpensive noncontact measuring apparatus of straightness.

The present invention is also directed to a measuring apparatus which measures a hole formed in a workpiece, comprising: a holding mount which holds a workpiece and has an injection port for injecting a gas into the hole formed in the workpiece; a ball which is inserted into the hole formed in the workpiece; an elastic member which elastically supports the ball; a converter which converts back pressure of the gas injected from the injection port into an electrical signal; an optical fiber which is attached to the ball and carries and projects light supplied from a light source; a light receiving unit which receives the light projected from the optical fiber; a moving device which moves the elastic member, the ball, and the optical fiber along a longitudinal direction of the hole; and a control unit which calculates cylindricity of the hole according to the electrical signal outputted from the converter and data of a change of peak position of an amount of light received by the light receiving unit while the ball is inserted into the hole formed in the workpiece and the ball is moved while automatically centripetally moved with respect to the hole by injecting the gas into the hole.

According to the present invention, while the ball inserted into the hole is moved along the longitudinal direction of the hole while automatically centripetally moved, the back pressure of the gas injected into the hole is detected by the converter, and at the same time the projected light from the optical fiber provided on the ball is received by the light receiving unit and the change of peak position of the amount of received light is calculated, so as to calculate the cylindricity of the hole, thus providing an inexpensive noncontact measuring apparatus of cylindricity.

THE PREFERRED EMBODIMENTS FOR CARRYING OUT THE INVENTION

Figure 1:
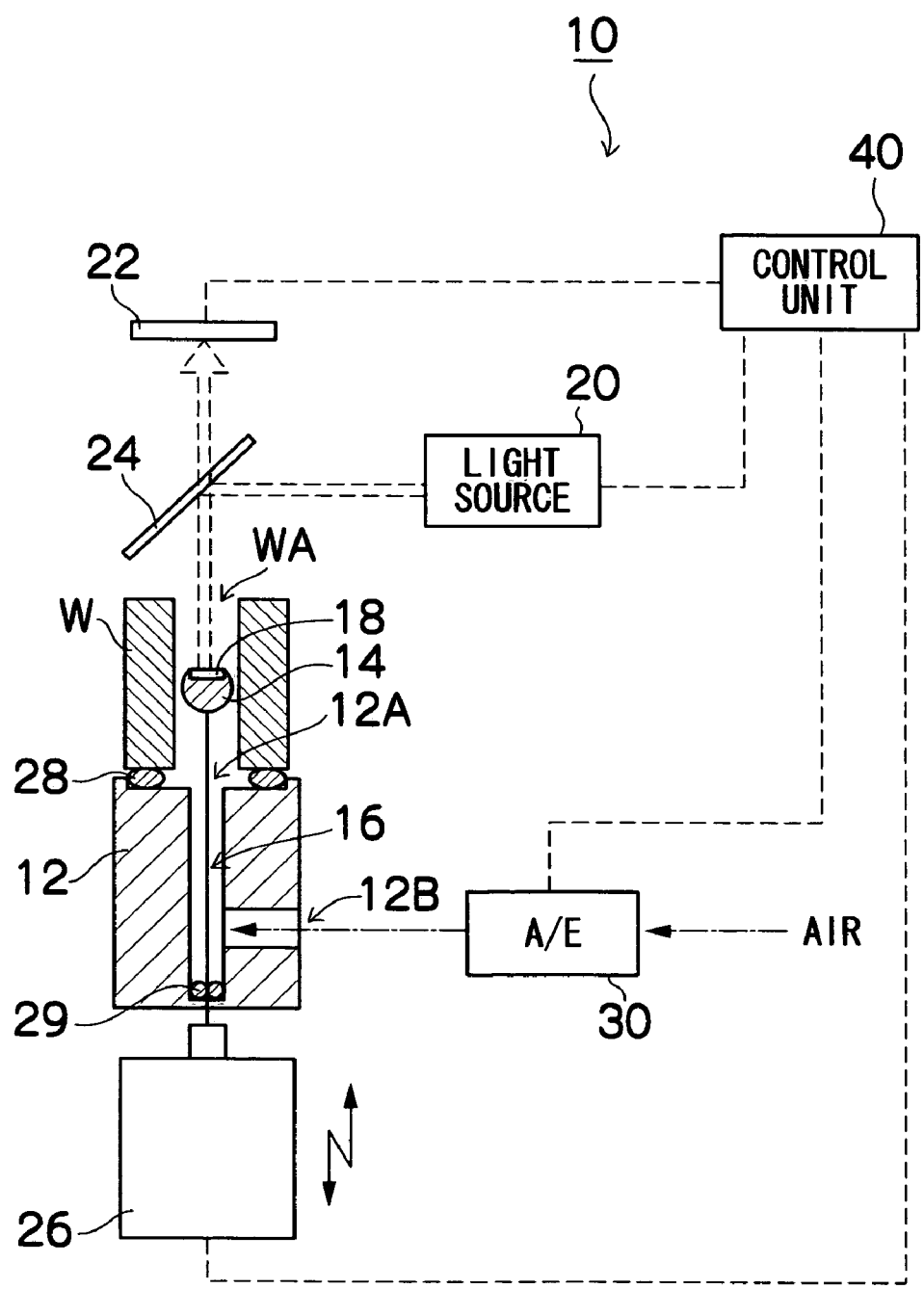
FIG. 1 is a sectional view of a measuring apparatus of a hole according to a first embodiment of the present invention.

Now, preferred embodiments of a measuring apparatus according to the present invention will be described in detail with reference to the accompanying drawings. In the drawings, like reference numerals designate like components.

FIG. 1 is a sectional view of a concept of a measuring apparatus which measures a hole formed in a workpiece according to the present invention. As shown in FIG. 1, a measuring apparatus 10 includes a holding mount 12 which holds a workpiece W, a ball 14 having a diameter slightly smaller than an inner diameter of a hole WA formed in the workpiece W, an elastic member 16 having a tip to which the ball 14 is attached, a lifting device 26 to which the other end of the elastic member 16 is connected and which vertically moves the elastic member 16 and the ball 14, an A/E (air/electricity) converter 30, a reflection member 18 mounted to a top of the ball 14, a light source 20, a light receiving unit 22, a semitransparent mirror 24, a control unit 40, or the like.

A steel ball having good sphericity is used as the ball 14, and a piano wire is used as the elastic member 16 which has the tip attached to the ball 14 and supports the ball 14. The lifting device 26 includes a linear guide, a ball screw, a stepping motor, or the like, which are known, and is controlled by the control unit 40 to vertically move the elastic member 16 and the ball 14.

The holding mount 12 is formed with an injection port 12A which injects air toward the hole WA to be measured of the workpiece W, and an air supply port 12B communicating with the injection port 12A. Compressed air is supplied to the air supply port 12B via the A/E converter 30, and the supplied air is injected from the injection port 12A toward the hole WA of the workpiece W. The A/E converter 30 is a device which converts back pressure of the air supplied to the air supply port 12B into an electrical signal using, for example, a bellows and a differential transformer, and the obtained electrical signal is sent to the control unit 40.

The semitransparent mirror 24 reflects substantially half of light projected from the light source 20 and projects the light onto the reflection member 18, and transmits substantially half of the reflected light from the reflection member 18 and projects the light onto the light receiving unit 22. A CCD is used as the light receiving unit 22, and a peak position of the amount of received light can be detected. Alternatively, four divided photocells may be used as the light receiving unit 22 instead of the CCD, to arithmetically operate the peak position of the amount of received light in the control unit 40. The light source 20 includes a laser or a halogen lamp, and projects narrowed collimated light.

The injection port 12A formed in the holding mount 12 is a through hole, into which the elastic member 16 supporting the ball 14 is inserted. To a bottom end of the injection port 12A, a gasket 29 is mounted to prevent air leakage from a gap between the elastic member 16 and the injection port 12A. To a top surface of the holding mount 12, a gasket 28 is similarly mounted to fill a gap between the workpiece W and the top surface of the holding mount 12, when the workpiece W is pressed and secured on the holding mount 12 by a pressing device (not shown).

The control unit 40 controls operations of the parts of the measuring apparatus 10, arithmetically operates a signal from the A/E converter 30 and a signal from the light receiving unit 22 to calculate a measurement value.

Next, operations of the measuring apparatus 10 thus configured will be described.

The workpiece W to be measured is placed on the holding mount 12. At this time, the gap between a bottom surface of the workpiece W and the top surface of the holding mount 12 is filled with the gasket 28. Then, the ball 14 is lifted by the lifting device 26 to be inserted into the hole WA of the workpiece W, and placed in a predetermined position. Next, the compressed air is supplied to the air supply port 12B of the holding mount 12 via the A/E converter 30, and is injected from the injection port 12A into the hole WA of the workpiece W. The injected air is discharged upward through a gap formed between the hole WA and the ball 14. At this time, the ball 14 supported by the elastic member 16 is simply cantilevered by the elastic member 16, and is thus automatically centripetally moved to the center of the hole WA by the action of air flowing through the gap.

The A/E converter 30 converts a change of the back pressure of the air, caused by a difference in size of the gap formed between the hole WA and the ball 14, into an electrical signal, and sends the obtained electrical signal to the control unit 40. The control unit 40 calculates an inner diameter of the hole WA of the workpiece W from the signal obtained by the A/E converter 30. Before the measurement, two types of masters, having known accurate inner diameters of holes, are used to calibrate a multiplying factor of the A/E converter 30.

Then, the ball 14 is moved by the lifting device 26, and the inner diameters of the hole WA in a plurality of positions are measured to calculate simple cylindricity of the hole WA.

Figure 2:
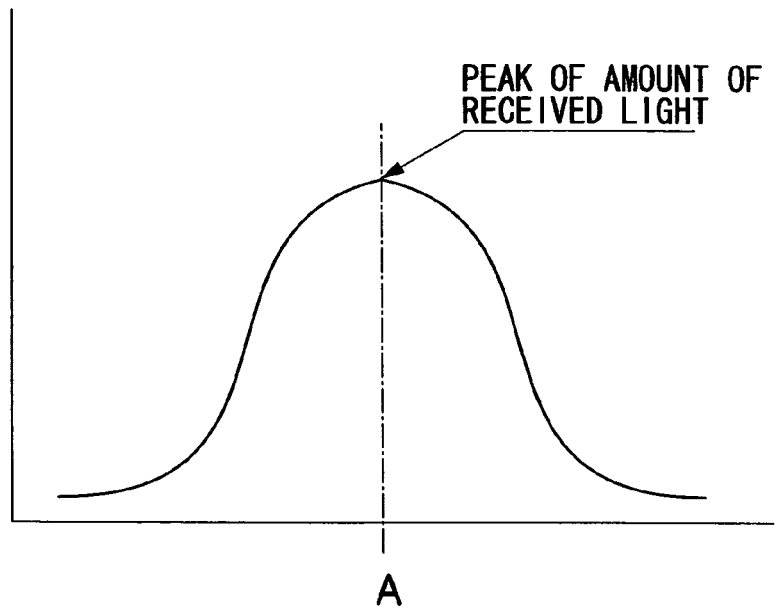
FIG. 2 is a graph of the amount of light received by a light receiving unit.

The reflection member 18 mounted to the top of the ball 14 is circular, and the collimated light is projected from the light source 20 onto the reflection member 18 via the semitransparent mirror 24. The projected light is reflected onto the light receiving unit 22 by the reflection member 18. The light receiving unit 22 includes the CCD or the four divided photocells, thus a peak position A of the amount of received light is calculated as shown in FIG. 2.

Figure 3:
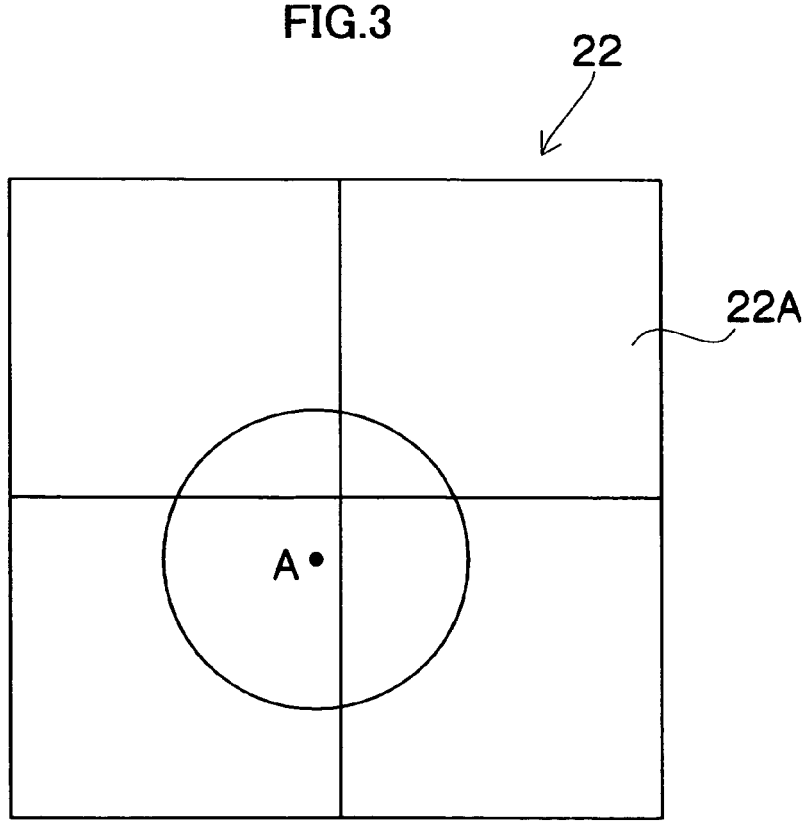
FIG. 3 is a plan view of projected light on four divided photocells.

FIG. 3 shows a state where the light is reflected from the reflection member 18 onto the light receiving unit 22 when the four divided photocells 22A are used as the light receiving unit 22. A peak position A of the amount of received light is calculated from output distribution of the four photocells. Specifically, the center of a circle having an area ratio corresponding to a ratio of the outputted values of the photocells is determined as the peak position A of the amount of received light.

The ball 14 is moved in the longitudinal direction of the hole WA of the workpiece W while using automatic centripetal action of the ball 14 by the air, so that displacement of the peak position A of the amount of received light is measured, thereby calculating straightness of the hole WA. The cylindricity including a straightness component of the hole WA is calculated from the straightness data and inner diameter data obtained from the A/E converter 30 in longitudinal positions of the hole WA, when the ball 14 is moved in the longitudinal direction of the hole WA. These measurement values are all arithmetically operated and calculated by the control unit 40.

Figure 4:
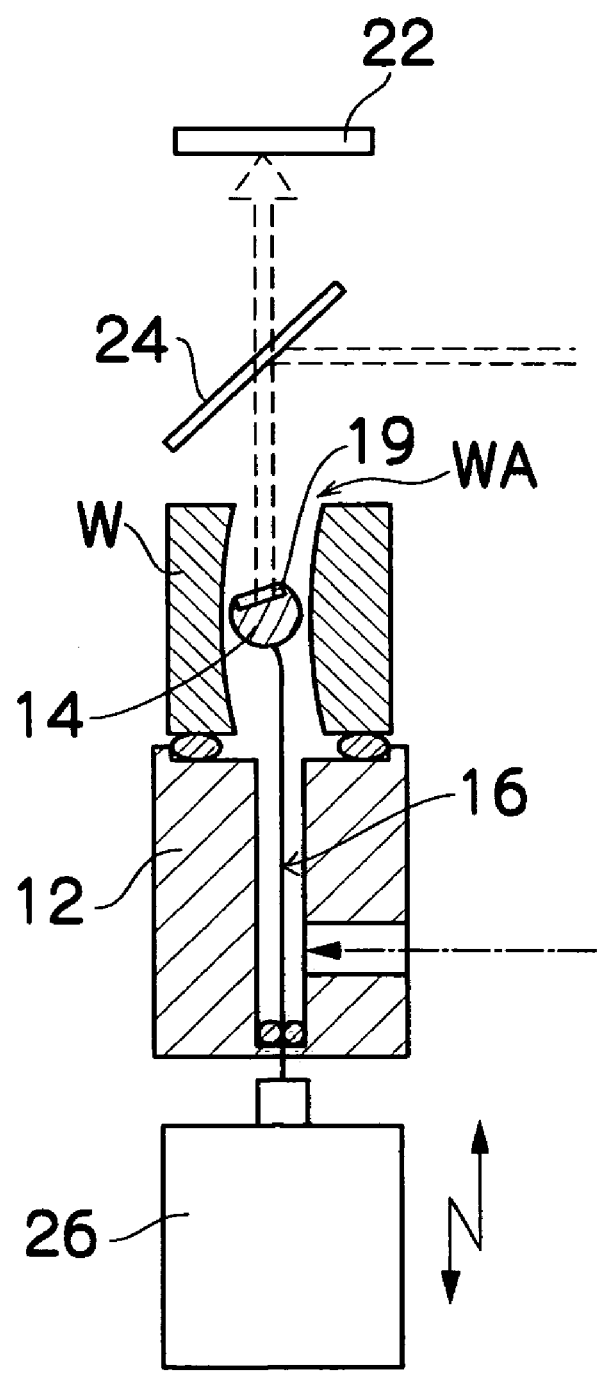
FIG. 4 is a sectional view of an example in which a corner cube is used as a reflection member.

FIG. 4 shows an example where a corner cube 19 is used as the reflection member mounted to the ball 14. As shown in FIG. 4, when the hole WA of the workpiece W is curved, the ball 14 is slightly inclined since it is cantilevered by the elastic member 16 and is automatically centripetally moved. When the reflection member is a plane mirror 18, the slight inclination of the ball causes slight inclination of the plane mirror 18, and the peak position of the amount of received light on the light receiving unit 22 is slightly displaced to cause a slight error in measurement of the straightness of the hole WA. On the other hand, when the reflection member is the corner cube 19 as shown in FIG. 4, an entering angle and a reflecting angle of the light with respect to the corner cube 19 are always equal, and the peak position of the amount of received light on the light receiving unit 22 is not displaced even if the corner cube 19 is inclined, thus allowing calculation of the straightness of the hole WA with higher accuracy. In FIG. 4, the A/E converter 30, the light source 20, and the control unit 40 are not shown.

Figure 5A:
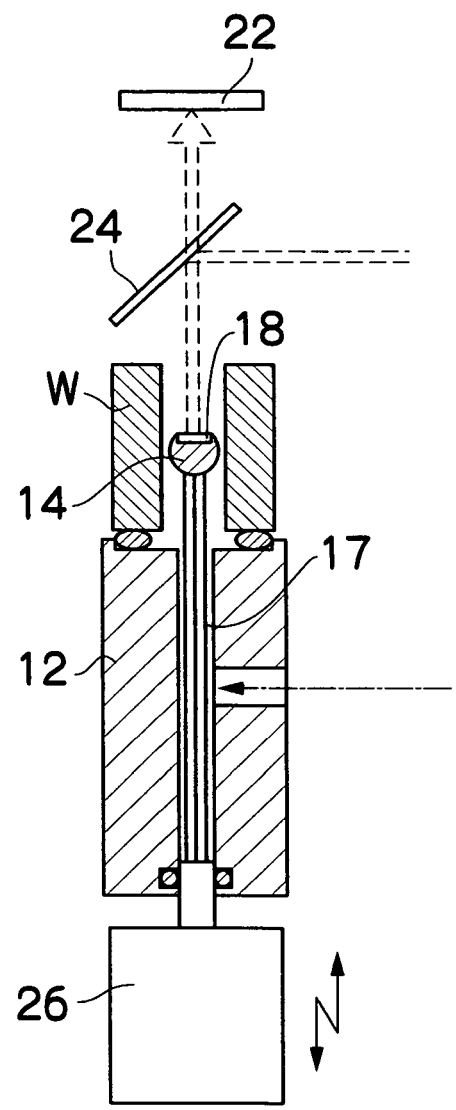
FIGS. 5(a) and 5(b) are sectional views of an example in which a parallel spring is used as an elastic member.
Figure 5B:
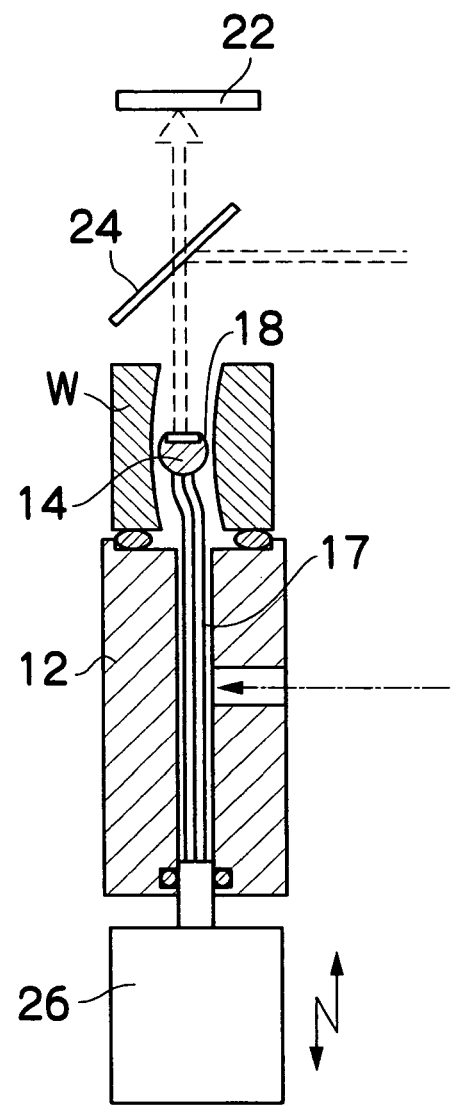

FIGS. 5(*a*) and 5(*b*) show an example where a parallel spring 17 constituted by three piano wires evenly spaced on a circle in parallel is used as the elastic member. FIG. 5(*a*) shows a state where the hole WA of the workpiece W is straight, and FIG. 5(*b*) shows a state where the hole WA of the workpiece W is curved. In FIGS. 5(*a*) and 5(*b*), the A/E converter 30, the light source 20, and the control unit 40 are not shown.

The elastic member which holds the ball 14 is the parallel spring 17 constituted by the three piano wires, thus even if the hole WA of the workpiece W is curved as shown in FIG. 5(*b*), the reflection member 18 is not inclined, and even if the reflection member 18 is the plane mirror, no error occurs in detection of the peak position of the amount of received light on the light receiving unit 22, thus allowing calculation of the straightness of the hole WA with higher accuracy like the case in FIG. 4.

Figure 6:
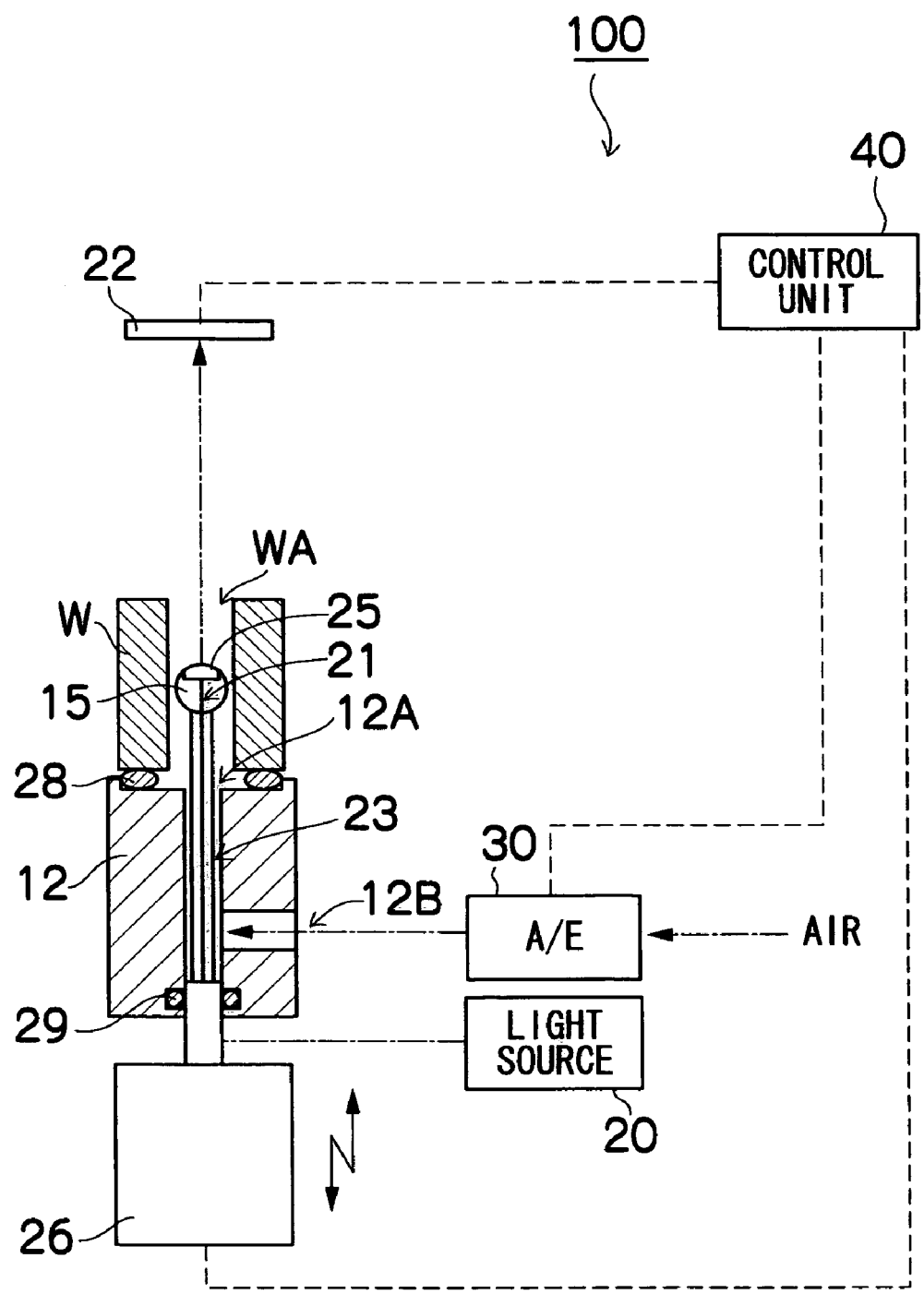
FIG. 6 is a sectional view of a measuring apparatus of a hole according to a second embodiment of the present invention.

Next, a preferred embodiment of a measuring apparatus according to a second embodiment of the present invention will be described. FIG. 6 is a conceptual sectional view of a measuring apparatus 100 which measures a hole formed in a workpiece according to the second embodiment. Like reference numerals designate like components as in the measuring apparatus 10 according to the first embodiment, and descriptions thereof will be omitted.

As shown in FIG. 6, the measuring apparatus 100 includes a ball 15 having a diameter slightly smaller than an inner diameter of a hole WA formed in a workpiece W, an optical fiber 21 having a tip attached to the ball 15 through a core of the ball 15, a collimating lens 25 which is mounted to a top of the ball 15 and faces the tip of the optical fiber 21, a light receiving unit 22 placed above the collimating lens 25, a light source 20 connected to the other end of the optical fiber 21, an elastic member 23 having a tip to which the ball 15 is attached, a lifting device 26 to which the other end of the elastic member 23 is connected and which vertically moves the elastic member 23, the ball 15, and the optical fiber 21, an A/E converter 30, and a control unit 40.

A steel ball having good sphericity is used as the ball 15, a hole through which the core passes is formed in the ball 15, and the tip of the optical fiber 21 is inserted into the hole and fastened with an adhesive. The collimating lens 25 is mounted to the top of the ball 15. The elastic member 23 whose tip is attached to the ball 15 and supports the ball 15 is a hollow straw-like elastic body, and the optical fiber 21 is inserted through the hollow portion. Light projected from the light source 20 is carried through the optical fiber 21, collimated by the collimating lens 25, and projected onto the light receiving unit 22. Instead of providing the collimating lens 25 as a separate component, an optical fiber having a lens formed at a tip thereof may be used.

The measuring apparatus 100 according to the second embodiment thus configured has the same configuration and operation as the measuring apparatus 10 according to the first embodiment, other than a difference in that the light from the light source 20 is projected onto the light receiving unit 22 via the optical fiber 21 instead of being reflected onto the light receiving unit 22 via the reflection member 18 or 19.

Next, a variation of the second embodiment will be described.

When the hole WA of the workpiece W is curved, the ball 15 is slightly inclined since it is cantilevered by the elastic member 23 and is automatically centripetally moved. The slight inclination of the ball 15 causes inclination of a projecting direction of the light from the optical fiber 21, and the peak position of the amount of received light on the light receiving unit 22 is slightly displaced to cause a slight error in measurement of the straightness of the hole WA. Thus, there is proposed a variation as shown in FIG. 7 for measurement of straightness with higher accuracy.

Figure 7:
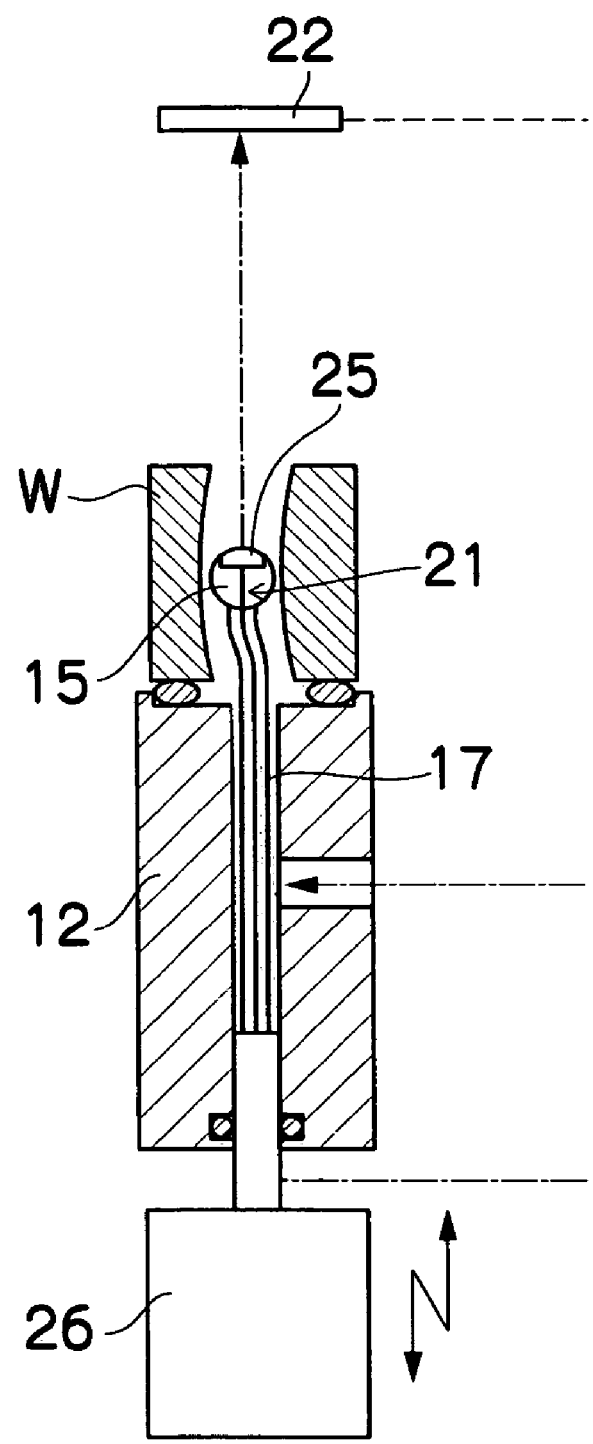
FIG. 7 is a sectional view of an example in which a parallel spring is used as an elastic member.

FIG. 7 shows a case where a parallel spring 17 constituted by three piano wires evenly spaced on a circle around the optical fiber 21 in parallel is used as an elastic member. The elastic member which holds the ball 15 is the parallel spring 17 constituted by the three piano wires, thus even if the hole WA of the workpiece W is curved as shown in FIG. 7, the ball 15 is not inclined, and no error occurs in detection of the peak position of the amount of received light on the light receiving unit 22. In FIG. 7, the A/E converter 30, the light source 20, and the control unit 40 are not shown.

Although the compressed air is used as the gas for measurement of the inner diameter of the hole to be measured, and for automatic centripetal action of the ball in the above described embodiments according to the present invention, the present invention is not limited to this, and $N_2$ gas, Ar gas, or the like can be appropriately selected.

INDUSTRIAL APPLICABILITY

As described above, according to the measuring apparatus of the present invention which measures the hole, the change of the back pressure of the gas by the difference in size of the gap between the hole and the ball inserted into the hole is detected to measure the inner diameter of the hole, the straightness of the hole is measured from the automatic centripetal action of the hole and the ball by the flow of the air, and the displacement of the peak position of the amount of received light from the member mounted to the ball, when the ball is moved along the hole, and the cylindricity of the hole is calculated from measurement data of both of them, thus providing an inexpensive measuring apparatus of the hole which can measure the inner diameter, the straightness, and the cylindricity with no contact.

The invention claimed is:

1. A measuring apparatus which measures a hole formed in a workpiece, comprising:
    a holding mount which holds a workpiece and has an injection port for injecting a gas into the hole formed in the workpiece;
    a ball which is inserted into the hole formed in the workpiece;
    an elastic member which elastically supports the ball;
    a reflection member which is mounted to the ball and reflects light supplied from a light source;
    a light receiving unit which receives the light reflected by the reflection member;
    a moving device which moves the elastic member and the ball along a longitudinal direction of the hole; and
    a control unit which calculates straightness of the hole by calculating a change of peak position of an amount of light received by the light receiving unit while the ball is inserted into the hole formed in the workpiece and the ball is moved while automatically centripetally moved with respect to the hole by injecting the gas into the hole.

2. The measuring apparatus as defined in claim 1, wherein the reflection member comprises a corner cube.

3. The measuring apparatus as defined in claim 1, wherein the elastic member comprises at least three linear elastic bodies which are parallel to each other.

4. A measuring apparatus which measures a hole formed in a workpiece, comprising:
    a holding mount which holds a workpiece and has an injection port for injecting a gas into the hole formed in the workpiece;
    a ball which is inserted into the hole formed in the workpiece;
    an elastic member which elastically supports the ball;
    a converter which converts back pressure of the gas injected from the injection port into an electrical signal;
    a reflection member which is mounted to the ball and reflects light supplied from a light source;
    a light receiving unit which receives the light reflected by the reflection member;
    a moving device which moves the elastic member and the ball along a longitudinal direction of the hole; and
    a control unit which calculates cylindricity of the hole according to the electrical signal outputted from the converter and data of a change of peak position of an amount of light received by the light receiving unit while the ball is inserted into the hole formed in the workpiece and the ball is moved while automatically centripetally moved with respect to the hole by injecting the gas into the hole.

5. The measuring apparatus as defined in claim 4, wherein the reflection member comprises a corner cube.

6. The measuring apparatus as defined in claim 4, wherein the elastic member comprises at least three linear elastic bodies which are parallel to each other.

7. A measuring apparatus which measures a hole formed in a workpiece, comprising:
    a holding mount which holds a workpiece and has an injection port for injecting a gas into the hole formed in the workpiece;
    a ball which is inserted into the hole formed in the workpiece;
    an elastic member which elastically supports the ball;
    an optical fiber which is attached to the ball and carries and projects light supplied from a light source;
    a light receiving unit which receives the light projected from the optical fiber;
    a moving device which moves the elastic member, the ball, and the optical fiber along a longitudinal direction of the hole; and
    a control unit which calculates straightness of the hole by calculating a change of peak position of an amount of light received by the light receiving unit while the ball is inserted into the hole formed in the workpiece and the ball is moved while automatically centripetally moved with respect to the hole by injecting the gas into the hole.

8. The measuring apparatus as defined in claim 7, wherein the elastic member comprises at least three linear elastic bodies which are parallel to each other.

9. A measuring apparatus which measures a hole formed in a workpiece, comprising:
- a holding mount which holds a workpiece and has an injection port for injecting a gas into the hole formed in the workpiece;
- a ball which is inserted into the hole formed in the workpiece;
- an elastic member which elastically supports the ball;
- a converter which converts back pressure of the gas injected from the injection port into an electrical signal;
- an optical fiber which is attached to the ball and carries and projects light supplied from a light source;
- a light receiving unit which receives the light projected from the optical fiber;
- a moving device which moves the elastic member, the ball, and the optical fiber along a longitudinal direction of the hole; and
- a control unit which calculates cylindricity of the hole according to the electrical signal outputted from the converter and data of a change of peak position of an amount of light received by the light receiving unit while the ball is inserted into the hole formed in the workpiece and the ball is moved while automatically centripetally moved with respect to the hole by injecting the gas into the hole.

10. The measuring apparatus as defined in claim 9, wherein the elastic member comprises at least three linear elastic bodies which are parallel to each other.

* * * * *